(12) United States Patent
Dobbins

(10) Patent No.: US 6,355,816 B1
(45) Date of Patent: Mar. 12, 2002

(54) PROCESS FOR ISOLATING SAPONINS FROM SOYBEAN-DERIVED MATERIALS

(75) Inventor: Thomas Dobbins, Howard, OH (US)

(73) Assignee: Wiley Organics, Inc., Coshocton, OH (US)

( * ) Notice: Subject to any disclaimer, the term of this patent is extended or adjusted under 35 U.S.C. 154(b) by 0 days.

(21) Appl. No.: 09/723,350

(22) Filed: Nov. 27, 2000

(51) Int. Cl.$^7$ .................................................. C07C 1/00

(52) U.S. Cl. ................................ 554/14; 554/12; 554/9

(58) Field of Search ................................. 554/14, 12, 9

(56) References Cited

PUBLICATIONS

Philip A. Ireland et al., Saponin Content of Soya and Some Commercial Soya Products by Means of High–performance Liquid Chromatography of the Sapogenins, J. Sci. Food Agric., 1986, 694–698.

K. Hostettmann et al., Saponins, Chemistry and Pharmacology of Natural Products, Cambridge University Press, pp. 142–145.

*Primary Examiner*—Deborah D. Carr
(74) *Attorney, Agent, or Firm*—Thompson Hine LLP

(57) ABSTRACT

This invention uses acetone/water mixtures at various concnetration and temperatures as a cost effective method for recoveing soy saponins of high purity from soybean-derived materials, while also affording an economical means of recovering soy isoflavones as a by-product.

20 Claims, No Drawings

PROCESS FOR ISOLATING SAPONINS FROM SOYBEAN-DERIVED MATERIALS

BACKGROUND OF THE INVENTION

Saponins are glycosides widely distributed in plants. Each saponin consists of one or more sugar moeities bonded to a 'sapogenin' aglycon. The sugar moities may be glucose, galactose, or a pentose or methylpentose, while the sapogenin may be a triterpene or a steroid.

Saponins have detergent properties, forming oil-in-water emulsions and producing copious quantities of foam or suds when dissolved in water. The name 'saponin' is derived from the Latin 'sapo' for 'soap'. Saponin-containing plants have been employed for centuries as soaps, notably soapwort (*Saponaria officialis*), soaproot (*Chlorogalum pomeridianum*), soapbark (*Quillaja saponaria*), and soapberry (*Sapindus mukurossi*).

Saponins are employed as foaming agents in soft drinks, frozen carbonated beverages, cocktail mixes, and fire extinguishers. Their detergent properties have resulted in their use in shampoos, facial cleansers, and various cosmetic compositions. Anti-microbial and anti-fungal properties as well as nutraceutical and pharmacological benefits have also been attributed to saponins.

The traditional methods of extracting and isolating saponins from dry vegetable materials consist of extracting with various alcohols (methanol, ethanol, propanol) or water-alcohol mixtures. A defatting step using non-polar organic solvents (i.e. petroleum ether or hexane) may be performed either prior to the extraction step or on the extract itself. Crude saponins are then precipitated by introducing a large volume of acetone or ether. K. Hostettmann and A. Marston, *Saponins*, Cambridge University Press (1995), pp. 143–145.

The laborious methods used to purify proteins, such as dialysis, ion-exchange chromatography, and size-exclusion chromatography, are often employed to effect further purification of saponins. P. A. Ireland, S. Z. Dziedzic, and M. W. Kearsley, "Saponin Content of Soya and Some Commercial Soya Products by Means of High-performance Liquid Chromatography of the Sapogenins," *J Sci. Food Agric.* 1986, 37, 694–698.

Soybean seeds (*Glycine max*, leguminosae) contain about 0.5% by weight saponins. P. A. Ireland, S. Z. Dziedzic, and M. W. Kearsley, "Saponin Content of Soya and Some Commercial Soya Products by Means of High-performance Liquid Chromatography of the Sapogenins," *J Sci. Food Agric.* 1986, 37, 694–698. Soy saponins have been the subject of investigation since the early $20^{th}$ century. These compounds consist of a triterpenoid skeleton with various sugar and acetyl moieties. The current consensus is that soyasapogenols A, B, and E are true aglycons, while soyasapogenols C, D, and E are artifacts of hydrolysis that occurs during the process of their isolation. The corresponding glycosides are the so-called 'group A saponins', 'group B saponins', and 'group E saponins', respectively.

Soy saponins have demonstrated anti-mutagenic properties that make them promising agents for cancer prophylaxis. M. J. Plewa et al, "The Use of Single Cell Electrophoresis and Flow Cytometry to Identify Antimutagens from Commercial Soybean Products." *Mutation Research*, 402 (1998), 211–218 and Li Baixiang, "The study on the Antimutation Mechanism of Soyasaponin" *Proceedings of the Third International Soybean Processing and Utilization Conference*, (2000), 264–265. Moreover, group B soy saponins have exhibited pronounced suppressive effects on the replication in vitro of the human immunodeficiency virus (HIV). H. Nakashima et al, *N. Aids*, 3, 10 (1989), 665–668. The chemical structure of soybean saponin is very similar to that of the compound glycyrrhizin, a known anti-viral agent, so soy saponins show promise as building blocks for the synthesis of anti-viral pharmaceutical compounds.

Despite the cultivation and processing of very large quantities of soybeans, at the present time soy saponins are not a significant article of commerce due to the difficulty of isolating and purifying them.

Soy protein concentrates and soy protein isolates are major articles of commerce widely manufactured by extracting hexane-defatted soybean meal with a solvent consisting of a mixture of ethanol and water (typically 75% ethanol by weight) at elevated temperatures. The purpose of this extraction is to separate lecithin, sugars, and complex carbohydrates from the proteins. The ethanol is recovered by fractional distillation, leaving an aqueous solution of sugars (predominantly sucrose, raffinose, and stachyose) and other carbohydrates that also contains isoflavones and saponins. This material is known in the trade as 'soy solubles' or 'soy molasses'.

By acidifying soy molasses, typically to a pH of 2.5 to 4.5 at elevated temperatures, isoflavone- and saponin-rich solids are precipitated. These solids can be removed by centrifugation or filtration, then dried to serve as a commercial feedstock for the recovery of soy isoflavones by extraction with suitable organic solvents (i.e. methanol, ethanol, acetone, etc.). U.S. Pat No. 5,919,921.

DETAILED DESCRIPTION OF THE INVENTION

The subject of the present invention uses acetone/water mixtures at various concentrations and temperatures as a cost-effective method for recovering soy saponins of high purity from soybean-derived materials, while also affording an economical means of recovering soy isoflavones as a by-product.

Although saponins are characteristically insoluble in acetone, mixtures of acetone and water are capable of dissolving saponins at elevated temperatures. The acetone-to-water ratio for this purpose may range from approximately 2.5 to 5.0 parts acetone per one part water and is optimally approximately 4:1 by weight. At appreciably higher concentrations of acetone, the efficiency of extracting saponins is unnecessarily diminished; at appreciably higher concentrations of water, the quantity of saponins recovered may be reduced and undesirable contaminants (chiefly oligosaccharides) are brought into solution, lowering the purity of the saponins that are recovered. Accordingly, while higher concentrations of acetone or water could be used, they might not be as efficient.

To extract the saponins, the feedstock is digested in the optimum acetone/water mixture at acetone reflux temperature (56 degrees C. at atmospheric pressure, or higher temperatures at elevated pressures) in order to bring the saponins into solution. The pH of the mixture should be high enough to bring the saponins into solution. For this purpose it is desirable to use a pH of at least 5.0, and preferably be 6.5 or higher. The undissolved solids are removed by centrifugation, filtration, or settling and decanting while maintaining a temperature greater than 50 degrees C. The centrate or filtrate containing the dissolved saponins is then cooled to a temperature of less than 10 degrees C. (preferably −5 to 5 degrees C), whereupon the dissolved soy saponins precipitate and can be removed by centriflugation, filtration, or settling and decanting. The soy isoflavones, which have proven difficult to separate from soy saponins in prior art, remain in solution and are removed in the centrate, filtrate, or decanted supernatant liquid, from which they can in turn be recovered by removing the acetone by fractional distillation and chilling the resulting aqueous pot fraction in order to render the isoflavones insoluble, permitting their recovery by filtration, centrifugation, or settling and decanting.

The ratio of feedstock to the acetone/water mixture can vary. The efficiency of extraction of the isoflavones using a ratio of feedstock to acetone/water mixture of approximately 1 to 10 by mass is typically very high, often exceeding 90%. However, the efficiency of saponin extraction with these parameters is considerably lower (typically 20 to 40%), although the purity of the saponins is quite high. Under these conditions, efficient saponin recovery may require two or more successive extractions with the optimal acetone/water solvent or recourse to counter-current extraction methods that will be obvious to those skilled in the art.

The saponins recovered by filtration, centrifugation, or settling and decanting the chilled wet acetone extract typically have a purity exceeding 70%. They can readily be further purified by dissolving them in a suitable solvent, filtering, and allowing them to crystallize. We have obtained excellent results using a solvent comprised of 70% ethanol/30% water in a ratio of ten to fifteen parts solvent to one part saponins by weight, although those skilled in the art will realize that mixtures of other alcohols and water may prove efficacious. The mixture is heated to 70 degrees C. or higher in order to effect the dissolution of the saponins, filtered at this temperature to remove insoluble impurities, and allowed to cool slowly to 25 degrees C. or less, whereupon saponins with a purity exceeding 95% crystallize and are recovered. Obtaining soy saponins of this purity without recourse to chromatographic techniques has heretofore not been reported.

EXAMPLE 1

1,000 grams of a commercial soy isoflavone concentrate derived from soy molasses ('Prevastein' from the Central Soya Company of Fort Wayne, Indiana, which is a powder with the following composition: 5.0% isoflavones, 10.16% saponins, 35% total carbohydrates, 7% lecithin, 2% fats, 33% proteins, 5% ash, 5% moisture) was added to a vigorously agitated mixture of 9,450 grams acetone and 2,350 grams of water. The mixture was heated to acetone reflux (56 degrees C.) for 90 minutes, then filtered on a Buechner funnel through Whatman #4 filter paper while maintaining a temperature of exceeding 50 degrees C.

The filtrate, a non-turbid, amber liquid, was chilled to 5 degrees C., whereupon an off-white precipitate fell out of solution. These solids were removed by vacuum filtration on a Buechner funnel through Whatman #4 filter paper while maintaining a temperature of less than 10 degrees C.

The filter cake was washed with a modest volume of pure acetone and dried in vacuo at 50 degrees C. to give 24.0 grams of ivory-colored solids with a purity (i.e. total saponin content) by HPLC exceeding 86%, corresponding to a recovery of 20.3%. The analysis also revealed that the amount of isoflavones contained in this material did not exceed 0.2% by weight. HPLC analysis of the chilled filtrate from this step revealed a concentration of only 0.06% by weight of dissolved saponins.

Following the isolation of the saponins, the acetone contained in the filtrate was stripped off by fractional distillation at atmospheric pressure and recovered for reuse. The stripped filtrate was then extracted with 500 grams of hexane with vigorous agitation at 60 degrees C. for 30 minutes to remove lecithin and fats. Agitation was ceased to allow the mixture to separate into layers; the top (organic) layer was removed and the bottom (aqueous) layer was chilled to <10 degrees C., whereupon soy isoflavones precipitated and were removed by vacuum filtration on a Buechner funnel through Whatman #4 paper. The filter cake was dried at 50 degrees C. in vacuo to give 53.5 grams of soy isoflavones with a purity (i.e. total isoflavone content) of 72% by HPLC, corresponding to a recovery of 77% of the isoflavones contained in the feedstock.

The "spent solids" (i.e. the feedstock that was initially extracted and removed from the hot acetone/water mixture by filtration) was added to a vigorously agitated mixture of 9,450 grams acetone and 2,350 grams of water. The mixture was heated to acetone reflux (56 degrees C.) for 90 minutes, then filtered on a Buechner funnel through Whatman #4 filter paper while maintaining a temperature of exceeding 50 degrees C.

The filtrate, a non-turbid, amber liquid, was chilled to 5 degrees C., whereupon an off-white precipitate fell out of solution. These solids were removed by vacuum filtration on a Buechner funnel through Whatman #4 filter paper while maintaining a temperature of less than 10 degrees C.

The filter cake was washed with a modest volume of pure acetone and dried in vacuo at 50 degrees C. to give 22.8 grams of ivory-colored solids with a purity (i.e. total saponin content) by HPLC of 88%, corresponding to a recovery of an additional 29.4% of the saponins that remained after the first extraction, or a total recovery of 46% of the saponins initially present in the starting material after two successive extractions. HPLC analysis also revealed that the amount of isoflavones contained in this material did not exceed 0.08% by weight. Once again, HPLC analysis of the chilled filtrate from this step revealed a concentration of only 0.06% by weight of dissolved saponins.

EXAMPLE 2

1,000 grams of a commercial soy isoflavone concentrate derived from soy molasses ('Solgen 10' from Solbar Plant Extracts, Ashdod, Israel, a powder with the following composition: 9.0% isoflavones, 8.1% saponins, 6% soluble dietary fiber, 6% non-complex sugars, 6% oligosaccharides, 7% lecithin, 1% fat, 18% proteins, 4% ash, 8% moisture) was added to a vigorously agitated mixture of 9,450 grams acetone and 2,350 grams of water. The pH of this slurry was 3. 1, too acidic for bringing saponins into solution, so 94 grams of a 50% by wt. aqueous solution of sodium hydroxide was slowly added to raise the pH to 6.5. The mixture was heated to acetone reflux (56 degrees C.) for 90 minutes, then vacuum filtered on a Buechner funnel through Whatman #4 filter paper while maintaining a temperature of 50 degrees C or higher.

The filtrate, a non-turbid, amber liquid, was chilled to 5 degrees C., whereupon an off-white precipitate fell out of solution. These solids were removed by vacuum filtration on a Buechner funnel through Whatman #4 filter paper while maintaining a temperature of less than 10 degrees C. The filter cake was washed with a modest volume of chilled acetone and dried in vacuo at 50 degrees C. to give 44 grams (4.4% of the mass of the feedstock, corresponding to a recovery of % of contained saponins) of light tan-colored solids with a purity (i.e. total saponin content) of 71% by HPLC, corresponding to a recovery of 38.5%. The isoflavone content of this material did not exceed 0.4% by weight. Analysis of this chilled filtrate by HPLC revealed a dissolved saponin content of 0.14%, corresponding to 14.9 grams contained. Following the isolation of the saponins, the acetone contained in the filtrate was stripped off by fractional distillation at atmospheric pressure and recovered for reuse. The stripped filtrate was then extracted with 500 grams of hexane with vigorous agitation at 60 degrees C. for 30 minutes to remove lecithin and fats. Agitation was ceased to allow the mixture to separate into layers; the top (organic) layer was removed and 1,000 ml of water was added to the bottom (aqueous) layer to reduce its viscosity. This solution was then chilled to <10 degrees C., whereupon soy isoflavones precipitated. After allowing the mixture to stand overnight, the supernatant liquid was decanted and the precipitate was dried at 50 degrees C. in vacuo to give 134 grams of soy isoflavones with a purity (i.e. total isoflavone content) by HPLC of 44%, corresponding to a recovery of 66% of the isoflavones contained in the feedstock.

While the invention has been described with reference to specific embodiments thereof, numerous modifications are possible without departing from the spirit and scope of the invention as defined by the following claims.

What is claimed is:

1. A method for recovering soy saponins which comprises:

extracting a soy isoflavone concentrate derived from soy molasses with a mixture of acetone and water, removing undissolved solids from the extract, cooling the extract such that soy saponins precipitate therefrom, and separating the precipitated soy saponins from the extract.

2. The method of claim 1 wherein the step of extracting the soy isoflavone concentrate is carried out at an elevated temperature.

3. The method of claim 2 wherein the step of extracting the soy isoflavone concentrate is carried out under acetone reflux.

4. The method of claim 3 wherein the step of cooling is carried out at a temperature less than about 10° C.

5. The method of claim 1 wherein the mixture of acetone and water contains about one part water to between 2.5 and 5 parts acetone.

6. The method of claim 5 wherein the mixture has a pH greater than 5.0.

7. The method of claim 6 wherein the mixture has a pH greater than about 6.5.

8. The method of claim 1 wherein the method includes the additional steps of stripping the acetone from the extract having the saponins removed, cooling the stripped extract, and recovering isoflavones therefrom.

9. The method of claim 1 wherein the soy isoflavone concentrate is obtained by acidifying soy molasses, typically at elevated temperatures, and recovering the precipitate.

10. The method of claim 4 wherein the temperature is about −5 to 5° C.

11. The method of claim 5 wherein the mixture contains at least 2.5 parts acetone to 1 part water.

12. The method of claim 2 wherein the elevated temperature is about 56° C. at atmospheric pressure to 150° C. at elevated pressures.

13. The method of claim 1 wherein said soy saponins are recovered with at least 70% purity.

14. The method of claim 8 wherein the stripped extract is first extracted with hexane.

15. The method of claim 1 wherein the undissolved solids are extracted with a mixture of acetone and water to obtain additional extract and the additional extract is cooled to precipitate additional soy saponins which are separated from the extract.

16. The method of claim 15 wherein the method is carried out using a counter-current extraction system.

17. A method which comprises:

extracting a soy isoflavone concentrate from soy molasses with a mixture of acetone and water in a countercurrent extractor to obtain an extract, cooling the extract such that soy saponins precipitate therefrom, and separating the soy saponins from the extract.

18. The method of claim 1 wherein the precipitated soy saponins are further purified by recrystallization.

19. The method of claim 18 wherein the precipitated soy saponins are recrystallized from a mixture of water and alcohol.

20. The method of claim 19 wherein the alcohol is ethanol.

* * * * *